M. E. FLINN.
FRUIT GATHERER.
APPLICATION FILED JUNE 22, 1917.
1,256,890.
Patented Feb. 19, 1918.
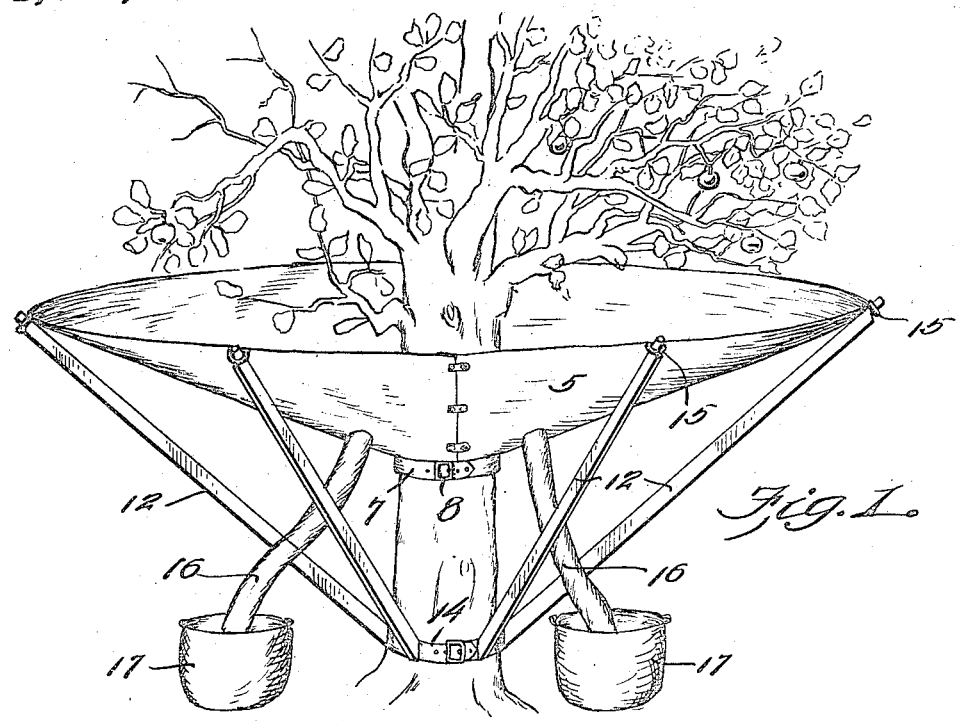
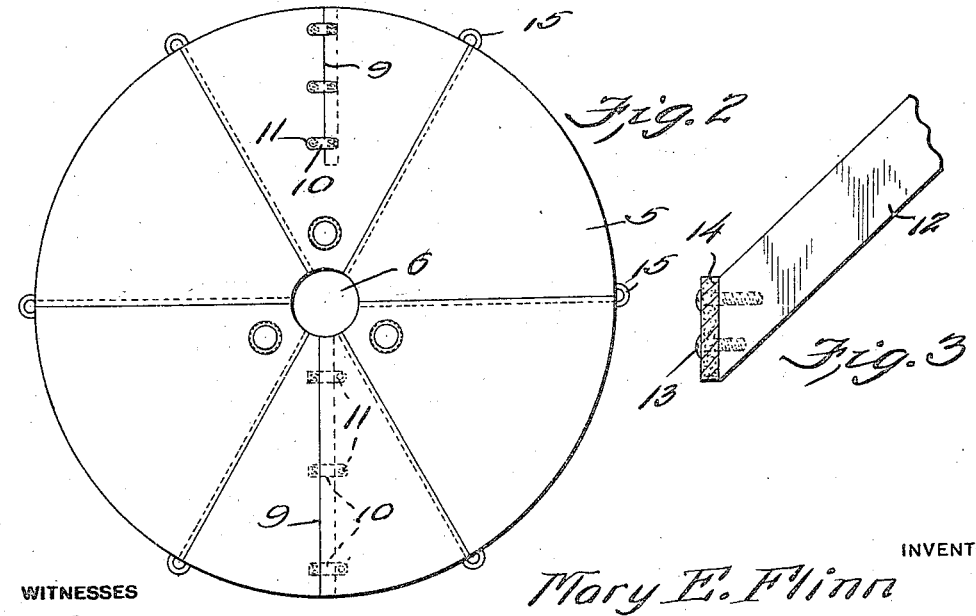
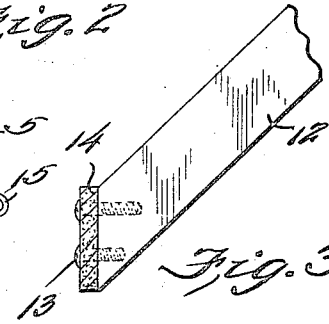
WITNESSES
INVENTOR
Mary E. Flinn
BY
ATTORNEY

UNITED STATES PATENT OFFICE.

MARY E. FLINN, OF MEDFORD, OREGON.

FRUIT-GATHERER.

1,256,890.  Specification of Letters Patent.  Patented Feb. 19, 1918.

Application filed June 22, 1917. Serial No. 176,384.

*To all whom it may concern:*

Be it known that I, MARY E. FLINN, a citizen of the United States, residing at Medford, in the county of Jackson and State of Oregon, have invented certain new and useful Improvements in Fruit-Gatherers, of which the following is a specification.

This invention relates to fruit gatherers, and has for its primary object to provide a simple and efficient means for collecting or gathering fruit dropped or shaken from trees, and for delivering the fruit to suitable receptacles.

A further object of the invention is to provide a gatherer of this character which is constructed in such manner as to minimize the opportunity for bruising or scarring of the fruit as it falls from the tree.

A still further object of the invention is to provide a gatherer of the type set forth which shall be of extremely simple and inexpensive construction, which is capable of being readily applied to or detached from a tree or bush, which may be folded and stored in a small space when not in use, and which will prove thoroughly practical for the purposes set forth.

With these objects in view together with others which will appear as the description proceeds, the invention resides in the novel formation, combination and arrangement of parts all as will be described more fully hereinafter, illustrated in the drawings and particularly pointed out in the claim.

In the drawing:

Figure 1 is a perspective view of a fruit gatherer constructed in accordance with the invention, the said gatherer being illustrated as applied to a tree, Fig. 2 is a plan view of the improved gatherer, and, Fig. 3 is a detail fragmentary sectional view illustrating the manner in which the supports for the gatherer are secured to the trunk encircling belt.

The invention comprehends generally the arrangement of a gatherer constructed of suitable inexpensive and flexible goods, the said goods being spread around the trunk of the tree and above the ground, so that fruit dropped or shaken from the branches of the tree will be retained by the body of the gatherer. Communicating with the upper surface of the gatherer are suitable spouts, and through which the fruit passes, and these spouts may be directed into suitable receptacles closely adjacent the base of the tree.

Referring now particularly to the drawing, 5 indicates the body of the collector which is adapted to be spread beneath the tree or bush and above the ground. This body is formed preferably of inexpensive cloth, and which shall possess sufficient strength to withstand the strains and pressures to which the same may be subjected. In the present instance, the body is formed of a plurality of sections stitched together as shown, to provide a circular body, the central portion of which is provided with an opening 6 through which the trunk or body of the tree projects. Secured to the cloth edges defining the opening 6 is a body strap 7, the ends of which are connected by a buckle 8 so that the cloth edges may be drawn snugly to the trunk of the tree. This body is cut radially as at 9, and the edges of the cut portions may be secured together by tabs 10 fastened down with any preferred form of snap fasteners indicated generally at 11. The body thus constructed is adapted to be secured around and beneath the tree and spaced above the ground.

For the purpose of securing this sheet or body in proper spread position, a supporting frame comprising a plurality of brace arms 12 is provided. These arms are secured as by screws or rivets 13 at one end to a truck engaging belt or body strap 14, and the outer ends of these arms are reduced and extended through loops or rings 15 in the outer edges of the body fabric. The belt 14 encircles and snugly fits the trunk of the tree adjacent the base thereof, and the arms 12 project outwardly and upwardly therefrom and are engaged at their free ends within the loops 15. When the gatherer is properly positioned, upon the tree body, the strap or belt 7 is below the outer edges of the fabric, so that fruit, nuts, etc., which drop upon the fabric will roll to the center thereof, adjacent the tree trunk.

Communicating with the interior of the body of the collector are spouts or leaders 16. These spouts may also be formed of inexpensive cloth, and are of relatively small diameters. These spouts communicate with the interior of the body adjacent the central portion thereof, so that the fruit collected within the body will roll into the same and pass out of the lower ends of the spouts. If desired, suitable receptacles such as those indicated at 17 may be positioned at the lower open ends of the spouts, so that the fruit will gravitate into said receptacles.

In practice, the gatherer is positioned upon the tree, in the manner illustrated in Fig. 1 of the drawing. The body of the gatherer is of such diameter that the outer edges thereof will protrude beyond the outermost limits of the tree limbs, so as to insure the collection of all fruit dropping from the tree limbs. Should it be desired to approach the tree to shake the same or to climb into the limbs thereof, the snaps 11 carried by the tabs 10 may be detached, and the orchardist may thus gain access to the tree trunk. As the orchardist approaches the tree trunk, he may button or secure the tabs 10 in place, so that fruit shaken from the tree limbs will not drop to the ground.

It will be observed that the radial cut 9 of the collector extends inwardly from the outer edges a distance equal substantially to one half the distance from the outer to the inner edges of the body. By so cutting the body, it is obvious that the strains and weight to which the body will be subjected when erected will not be borne entirely by the snap fasteners 10—11 connecting the cloth defining the cut. That portion of the body which remains uncut will assume the greater part of such strain, and danger of the slitted portions becoming unfastened will be obviated. Furthermore, by having only one of the slits extending from the outer to the inner edges of the body, the latter may be applied to trunks of trees varying in size without danger of puckering of the cloth where it contacts with the tree trunk, and the opportunity for the snap fasteners to be thus disalined will be eliminated.

From the foregoing it is apparent that I have provided an extremely simple and yet thoroughly efficient means for collecting fruit from trees, and one which shall prove inexpensive of construction and maintenance.

While the present is a disclosure of what is believed to be the preferred embodiment of the invention, it is to be understood that the invention is not limited thereto, but that various changes in the minor details of construction, proportion and arrangement of parts may be resorted to if desired without departing from the spirit of the invention as defined by the appended claim.

What is claimed is:

In a fruit gatherer, a collector comprising a body formed of cloth and having a central aperture, the said body having a cut from the outer edge to the edges of the cloth defining said aperture, means for securing the ends of said body together, the said body having also a cut opposite said first cut extending inwardly from its outer edge a distance substantially one half the distance from the outer to the inner edges thereof, fasteners for detachably securing the edges of said cut portion together, and means for securing said collector around a tree with the latter extending through said central aperture.

In testimony whereof I affix my signature in presence of two witnesses.

MARY E. FLINN.

Witnesses:
CHARLES S. DINGWALL,
A. STEHT.

Copies of this patent may be obtained for five cents each, by addressing the "Commissioner of Patents, Washington, D. C."